United States Patent
Moore et al.

(10) Patent No.: US 11,256,755 B2
(45) Date of Patent: *Feb. 22, 2022

(54) TAG MAPPING PROCESS AND PLUGGABLE FRAMEWORK FOR GENERATING ALGORITHM ENSEMBLE

(71) Applicant: General Electric Company, Schenectady, NY (US)

(72) Inventors: Ian Moore, Burnaby (CA); Massoud Seifi, Burnaby (CA); Alex Clark, Burnaby (CA)

(73) Assignee: General Electric Company, Schenectady, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/807,543

(22) Filed: Mar. 3, 2020

(65) Prior Publication Data
US 2020/0201916 A1    Jun. 25, 2020

Related U.S. Application Data

(63) Continuation of application No. 15/635,828, filed on Jun. 28, 2017, now Pat. No. 10,599,720.

(51) Int. Cl.
*G06F 17/00* (2019.01)
*G06F 16/903* (2019.01)
*G06F 16/907* (2019.01)

(52) U.S. Cl.
CPC ...... *G06F 16/90335* (2019.01); *G06F 16/907* (2019.01)

(58) Field of Classification Search
CPC .................. G06F 16/90335; G06F 16/907
See application file for complete search history.

(56) References Cited

U.S. PATENT DOCUMENTS

| | | | |
|---|---|---|---|
| 9,773,040 B2 * | 9/2017 | Weisman | G06F 16/90335 |
| 10,599,720 B2 * | 3/2020 | Moore | G06F 16/907 |
| 2004/0148278 A1 * | 7/2004 | Milo | G06F 16/986 |
| 2013/0238659 A1 * | 9/2013 | Roitman | G06F 21/6227 707/781 |
| 2015/0363484 A1 * | 12/2015 | Kamath | G06F 16/907 707/751 |
| 2016/0019600 A1 * | 1/2016 | Smith | G06Q 30/0201 705/7.29 |
| 2016/0048520 A1 * | 2/2016 | Levy | G06F 40/258 707/748 |

(Continued)

*Primary Examiner* — Greta L Robinson
(74) *Attorney, Agent, or Firm* — Buckley, Maschoff & Talwalkar LLC

(57) ABSTRACT

The example embodiments are directed to a system and method for tag mapping. In one example, the method includes receiving a request to perform tag mapping for a target tag of a master data set, the target tag representing a target component of an asset, querying a customer data for a plurality of candidate tag records based on the target tag, tokenizing the plurality of candidate tag records included in the customer data set, reducing an amount of the tokenized tag records in the customer data set based on the target tag and each tokenized candidate tag record, performing tag mapping with the reduced amount of tokenized tag records to identify at least one candidate tag that is a possible match to the target tag, and outputting information concerning the identified at least one matching candidate tag.

20 Claims, 9 Drawing Sheets

(56) References Cited

U.S. PATENT DOCUMENTS

2017/0075984 A1* 3/2017 Deshpande ............ G06F 16/319
2017/0083484 A1* 3/2017 Patil ...................... G06F 16/686
2017/0083523 A1* 3/2017 Philip .................... G06F 16/248
2018/0129714 A1* 5/2018 Saxena ............ G05B 19/41845

* cited by examiner

TAG MAPPING PROCESS AND PLUGGABLE FRAMEWORK FOR GENERATING ALGORITHM ENSEMBLE

CROSS-REFERENCE TO RELATED APPLICATIONS

This application is a continuation of U.S. patent application Ser. No. 15/635,828 filed on Jun. 28, 2017, in the United States Patent and Trademark Office, the entire disclosure of which is hereby incorporated herein for all purposes.

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include healthcare machines and equipment that aid in diagnosing patients such as imaging devices (e.g., X-ray or MRI systems), monitoring devices, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

An operator typically associates virtual "tags" with sensors in order to identify parts of the asset for each sensor. For example, an oil rig may use tags identifying a motor, a hose, a drill line, etc., a wind turbine may have tags identifying a rotor, a drive train, a tower, etc., a gas turbine may have tags identifying an air compressor, a combustor, a burner, etc., and the like. That is, tags serve as identifiers for components that make up an asset. However, at present there is no standard naming convention for tags. As a result, different companies often have their own naming conventions for components of an asset. In addition, the same company may have multiple internal locations, each which may have assets that use different naming conventions, even where the assets are of the same type or from the same manufacturer.

In a complex asset environment, the proliferation of non-standardized tags significantly impedes the implementation of data monitoring and analytic solutions as a user must painstakingly associate each tagged component of each with the appropriate software input. Prior art approaches to this problem often involve highly time-consuming and error-prone manual user operations that do not scale well and result in unwanted data errors. Moreover, traditional computing techniques are incapable of parsing a large body of potential non-standardized tag records to automatically map different tags associated with the same sensors to one another. What is needed is a system and method capable of mapping together asset tags having different naming conventions.

SUMMARY

Embodiments described herein improve upon the prior art by providing systems and methods which automate the process of tag mapping for tags of a virtual asset. At present there is no standard naming convention for tags on a virtual asset. As a result, many companies have their own unique naming conventions. Conventional tag mapping requires a user to manually identify tags between two virtual assets that are the same. Typically the user views a model of the virtual assets, makes a comparison, and then identifies part names/identifiers. In contrast, the example embodiments map tags of virtual assets that have different naming conventions without requiring user intervention. The tag mapping process may be performed based on machine learning and information retrieval techniques. By mapping tags together from different virtual assets, the assets can be analyzed together and can provide information useful for future action. Other embodiments provided herein are for a pluggable framework that optionally enables a user to plug-in and replace individual algorithms included in an algorithm ensemble that performs data processing operations such as tag mapping. In some examples, the example embodiments herein may be incorporated within software that is deployed on a cloud platform for use with an Industrial Internet of Things (IIoT) system. The embodiments disclosed herein take advantage of previously unavailable techniques including big data processing techniques, specialized machine learning techniques and associated know-how in order to improve on the previous manual approaches performed in the prior art.

In an aspect of an example embodiment, a computer-implemented method includes receiving a request to perform tag mapping for a target tag of a master data set, the target tag representing a target component of an asset, querying a customer data set and identifying a plurality of candidate tag records based on the target tag of the master data set, tokenizing the plurality of candidate tag records included in the customer data set, reducing an amount of the tokenized tag records in the customer data set based on the target tag and each tokenized candidate tag record, performing tag mapping with the reduced amount of tokenized tag records to identify at least one candidate tag of the customer data set that is a possible match to the target tag of the master data set, and outputting information concerning the identified at least one matching candidate tag for display on a display device.

In an aspect of another example embodiment, a computing system includes a network interface configured to receive a request to perform tag mapping for a target tag of a master data set, the target tag representing a target component of an asset, a processor configured to query a customer data set and identify a plurality of candidate tag records based on the target tag of the master data set, tokenize the plurality of candidate tag records included in the customer data set, reduce an amount of the tokenized tag records in the customer data set based on the target tag and each tokenized tag record, and perform tag mapping with the reduced amount of tokenized tag records to identify at least one candidate tag of the customer data set that is a possible match to the target tag of the master data set, and an output configured to output information concerning the identified at least one matching candidate tag for display on a display device.

In an aspect of another example embodiment, a computer-implemented method includes receiving a selection of an algorithm from among a plurality of available algorithms, inserting the selected algorithm into an algorithm ensemble including a grouping of algorithms which combine to perform a data processing operation, the inserting comprising linking an input of the selected algorithm to an output of a first algorithm and linking an output of the selected algorithm to an input of a second algorithm, from among the algorithms included in the algorithm ensemble, and executing the algorithm ensemble on input data in an order defined by the linking to generate a processing result of the input data.

In an aspect of yet another example embodiment, a computing system includes a memory and a processor configured to execute instructions stored in the memory, wherein, when executed, the instructions cause the processor to receive a selection of an algorithm from among a plurality of available algorithms, insert the selected algorithm into an algorithm ensemble including a grouping of algorithms which combine to perform a data processing operation, the inserting comprising linking an input of the selected algorithm to an output of a first algorithm and linking an output of the selected algorithm to an input of a second algorithm, from among the algorithms included in the algorithm ensemble, and execute the algorithm ensemble on input data in an order defined by the linking to generate a processing result of the input data.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
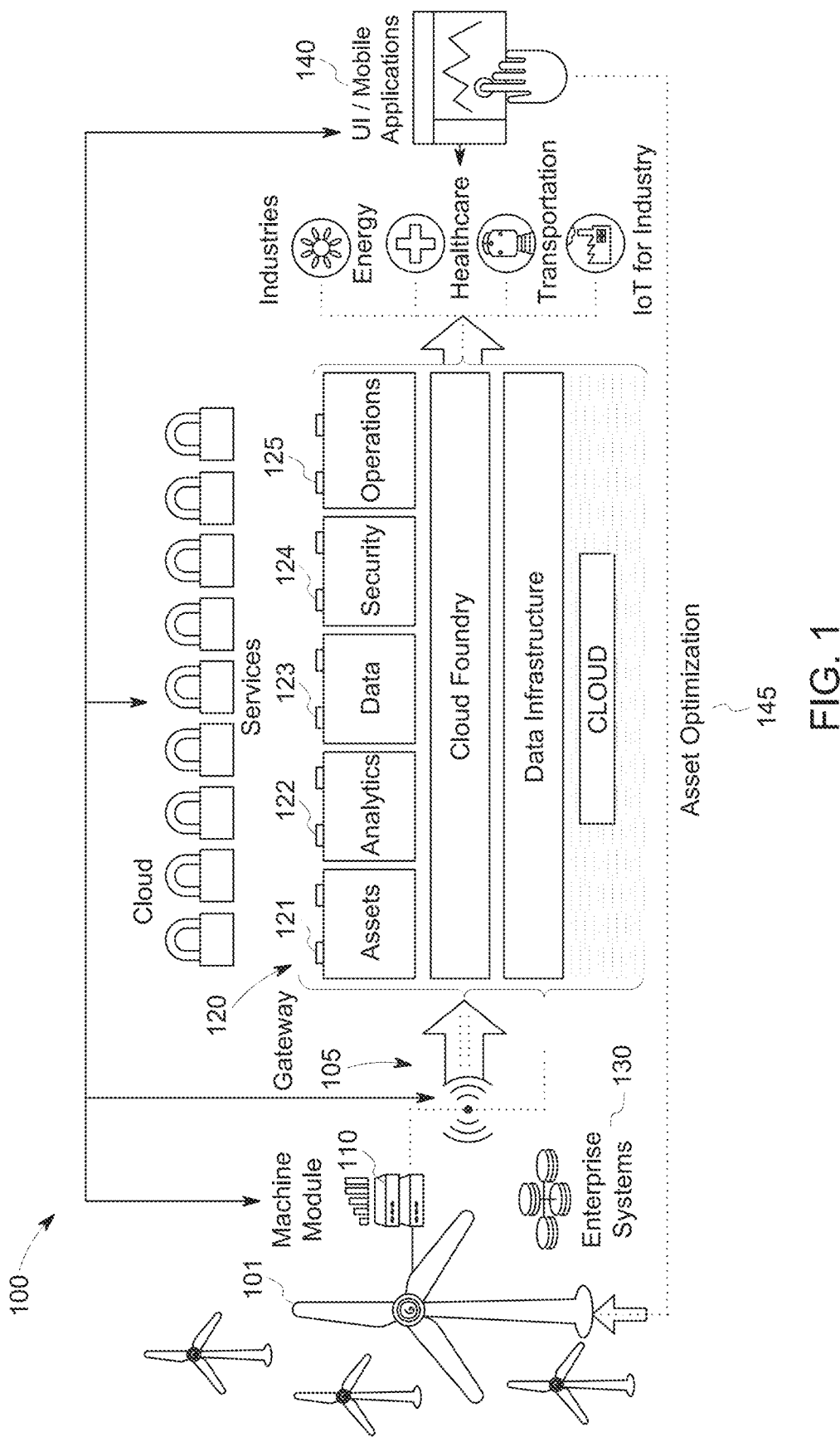
FIG. 1 is a diagram illustrating a cloud computing environment associated with industrial systems in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a software program and system capable of performing an automated tag mapping process for virtual assets having different naming convention. Tags, as referred to herein, are identifier or representations of components of a virtual asset. As a non-limiting example, an asset such as an oil rig may have a virtual model (i.e., a digital twin) created in which tags are used as identifiers of components such as a drilling line, a mud pump, a fuel tank, a boom, a hoist line, engine generator, and the like. The tag may include alphanumeric characters or a grouping of words which are used to identify the component. The tag mapping process may incorporate information retrieval techniques and algorithms to narrow down a search space of potential tag matches for a target tag. Examples of information processing techniques that may now be adapted to the specialized problem of tag mapping according to the novel techniques described herein are provided in "An Introduction to Information Retrieval" to Manning et al., Cambridge University Press, 2009, and "Statistical Machine Learning for Information Retrieval" to Berger, Carnegie Melon University, 2001, which are both incorporated herein by reference. The information retrieval process may include a robust low fidelity algorithm that can quickly and efficiently reduce the search space to a fraction of potential candidate tags. Furthermore, a high fidelity algorithm may be performed to accurately determine a ranking for the remaining candidate tags, and a predetermined amount of the highest ranking candidate tags (e.g., top 10 candidate tags) may be output as possible matches for the target tag. The algorithm provides an automated process for matching together tags representing a same component from different virtual assets having different naming conventions. By grouping together tags, the tags can be analyzed together which can provide more analysis and understanding of assets.

In addition, the example embodiments are directed to a novel pluggable framework that enables designers and programmers the ability to create algorithm ensembles for data processing operations (e.g., tag mapping, etc.) by simply plugging-in data and algorithms into the ensemble without affecting the other algorithms included in the ensemble. The pluggable components such as data and algorithms may adhere to a common data frame structure for inputs and outputs (see FIG. 6). Accordingly, as long as the components maintain the common data frame as an input and an output, the components can simply be removed and replaced without affecting the remaining components of the algorithm ensemble. Furthermore, a user such as a data scientist, programmer can use any of multiple programming languages (e.g., Java, Python, R) to design an algorithm without worrying about how it affects the other algorithms included in the algorithm ensemble.

A virtual asset may be a digital model of a physical asset used in manufacturing, industry, healthcare, transportation, and the like. In the examples herein, a virtual asset may include tags which are used to identify or otherwise represent a component on the virtual asset. As a non-limiting example, a virtual asset may include dozens of components each having their own respective tag. Furthermore, each company or organization may use their own naming conventions for tags because there is no standard naming convention for tagging purposes. As a result, the same part of a virtual asset may have different tag identifiers between different organizations, or even different internal groups within a same organization. But various data associated with virtual assets can only be measured or values based on grouping together assets and making a comparison between the assets. Therefore, there is a need to link virtual assets together. Tag mapping provides a link between two virtual assets having different naming conventions by linking together tags.

While progress with machine and equipment automation has been made over the last several decades, and assets have become "smarter," the intelligence of any individual asset pales in comparison to intelligence that can be gained when multiple smart devices are connected together, for example, in the cloud. Assets, as described herein, may refer to equipment and machines used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

For example, an asset can be outfitted with one or more sensors configured to monitor respective operations or conditions. Data from the sensors can be recorded or transmitted to a cloud-based or other remote computing environment. By bringing such data into a cloud-based computing environment, new software applications informed by industrial process, tools and know-how can be constructed, and new analytics specific to an industrial environment can be created. Insights gained through analysis of such data can lead to enhanced asset designs, enhanced software algorithms for operating the same or similar assets, better operating efficiency, and the like. Examples of the methods-based software applications are described herein as analytics. Analytics may be used to analyze, evaluate, and further understand issues related to manufacturing.

The assets can include or can be a portion of an Industrial Internet of Things (IIoT). In an example, an IIoT connects assets including machines and equipment, such as turbines, jet engines, healthcare machines, locomotives, and the like, to the Internet or cloud, or to each other in some meaningful way such as through one or more networks. The systems and methods described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of assets with the remote computing resources to enable the IIoT often presents technical challenges separate and distinct from the specific industry and from computer networks, generally. A given machine or equipment based asset may need to be configured with novel interfaces and communication protocols to send and receive data to and from distributed computing resources. Given assets may have strict requirements for cost, weight, security, performance, signal interference, and the like such that enabling such an interface is rarely as simple as combining the asset with a general-purpose computing device. To address these problems and other problems resulting from the intersection of certain industrial fields and the IIoT, embodiments provide a cloud platform that can receive and host applications from many different fields of industrial technologies. In particular, a tag mapping software program may be hosted by the cloud platform. The tag mapping software may map together tags from multiple virtual assets having different naming conventions.

The Predix™ platform available from GE is a novel embodiment of an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights.

FIG. 1 illustrates a cloud computing environment associated with industrial systems in accordance with an example embodiment. FIG. 1 illustrates generally an example of portions of an asset management platform (AMP) 100. As further described herein, one or more portions of an AMP can reside in a cloud computing system 120, in a local or sandboxed environment, or can be distributed across multiple locations or devices. The AMP 100 can be configured to perform any one or more of data acquisition, data analysis, or data exchange with local or remote assets, or with other task-specific processing devices. The AMP 100 includes an asset community (e.g., turbines, healthcare machines, oil rigs, mining equipment, chemical processing systems, etc.) that is communicatively coupled with the cloud computing system 120. In an example, a machine module 110 receives information from, or senses information about, at least one asset member of the asset community, and configures the received information for exchange with the cloud computing system 120. In an example, the machine module 110 is coupled to the cloud computing system 120 or to an enterprise computing system 130 via a communication gateway 105.

In an example, the communication gateway 105 includes or uses a wired or wireless communication channel that extends at least from the machine module 110 to the cloud computing system 120. The cloud computing system 120 may include several layers, for example, a data infrastructure layer, a cloud foundry layer, and modules for providing various functions. In the example of FIG. 1, the cloud computing system 120 includes an asset module 121, an analytics module 122, a data acquisition module 123, a data security module 124, and an operations module 125. Each of the modules includes or uses a dedicated circuit, or instructions for operating a general purpose processor circuit, to perform the respective functions. In an example, the modules 121-125 are communicatively coupled in the cloud computing system 120 such that information from one module can be shared with another. In an example, the modules 121-125 are co-located at a designated datacenter or other facility, or the modules 121-125 can be distributed across multiple different locations.

An interface device 140 (e.g., user device, workstation, tablet, laptop, appliance, kiosk, and the like) can be configured for data communication with one or more of the machine module 110, the gateway 105, and the cloud computing system 120. The interface device 140 can be used to monitor or control one or more assets. As another example, the interface device 140 may be used to develop and upload applications to the cloud computing system 120. As yet another example, the interface device 140 may be used to access analytical applications hosted by the cloud computing system 120. In an example, information about the asset community may be presented to an operator at the interface device 140. The information about the asset community may include information from the machine module 110, or the information can include information from the cloud computing system 120. The interface device 140 can include options for optimizing one or more members of the asset community based on analytics performed at the cloud computing system 120. Prior to analytics being accessed through the cloud computing system 120, the cloud computing system 120 may certify the analytics.

As a non-limiting example, a user of the interface device 140 may control an asset through the cloud computing system 120, for example, by selecting a parameter update for a first wind turbine 101. In this example, the parameter update may be pushed to the first wind turbine 101 via one or more of the cloud computing system 120, the gateway 105, and the machine module 110. In some examples, the interface device 140 is in data communication with the enterprise computing system 130 and the interface device 140 provides an operation with enterprise-wide data about the asset community in the context of other business or process data. For example, choices with respect to asset optimization can be presented to an operator in the context of available or forecasted raw material supplies or fuel costs. As another example, choices with respect to asset optimization can be presented to an operator in the context of a process flow to identify how efficiency gains or losses at one asset can impact other assets.

Returning again to the example of FIG. 1 some capabilities of the AMP 100 are illustrated. The example of FIG. 1 includes the asset community with multiple wind turbine assets, including the first wind turbine 101. However, it should be understood that wind turbines are merely used in this example as a non-limiting example of a type of asset that can be a part of, or in data communication with, the first AMP 100. FIG. 1 further includes the device gateway 105 configured to couple the asset community to the cloud computing system 120. The device gateway 105 can further couple the cloud computing system 120 to one or more other assets or asset communities, to the enterprise computing system 130, or to one or more other devices. The AMP 100 thus represents a scalable industrial solution that extends from a physical or virtual asset (e.g., the first wind turbine 101) to a remote cloud computing system 120. The cloud computing system 120 optionally includes a local, system, enterprise, or global computing infrastructure that can be optimized for industrial data workloads, secure data communication, and compliance with regulatory requirements.

The cloud computing system 120 can include the operations module 125. The operations module 125 can include services that developers can use to build or test Industrial Internet applications, and the operations module 125 can include services to implement Industrial Internet applications, such as in coordination with one or more other AMP modules. In an example, the operations module 125 includes a microservices marketplace where developers can publish their services and/or retrieve services from third parties. In addition, the operations module 125 can include a development framework for communicating with various available services or modules. The development framework can offer developers a consistent look and feel and a contextual user experience in web or mobile applications. Developers can add and make accessible their applications (services, data, analytics, etc.) via the cloud computing system 120.

Information from an asset, about the asset, or sensed by an asset itself may be communicated from the asset to the data acquisition module 123 in the cloud computing system 120. In an example, an external sensor can be used to sense information about a function of an asset, or to sense information about an environment condition at or near an asset. The external sensor can be configured for data communication with the device gateway 105 and the data acquisition module 123, and the cloud computing system 120 can be configured to use the sensor information in its analysis of one or more assets, such as using the analytics module 122. Using a result from the analytics module 122, an operational model can optionally be updated, such as for subsequent use in optimizing the first wind turbine 101 or one or more other assets, such as one or more assets in the same or different asset community. For example, information about the first wind turbine 101 can be analyzed at the cloud computing system 120 to inform selection of an operating parameter for a remotely located second wind turbine that belongs to a different asset community.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120. A special emphasis may be placed on time series data, as it is the data format that most sensors use.

Figure 2:
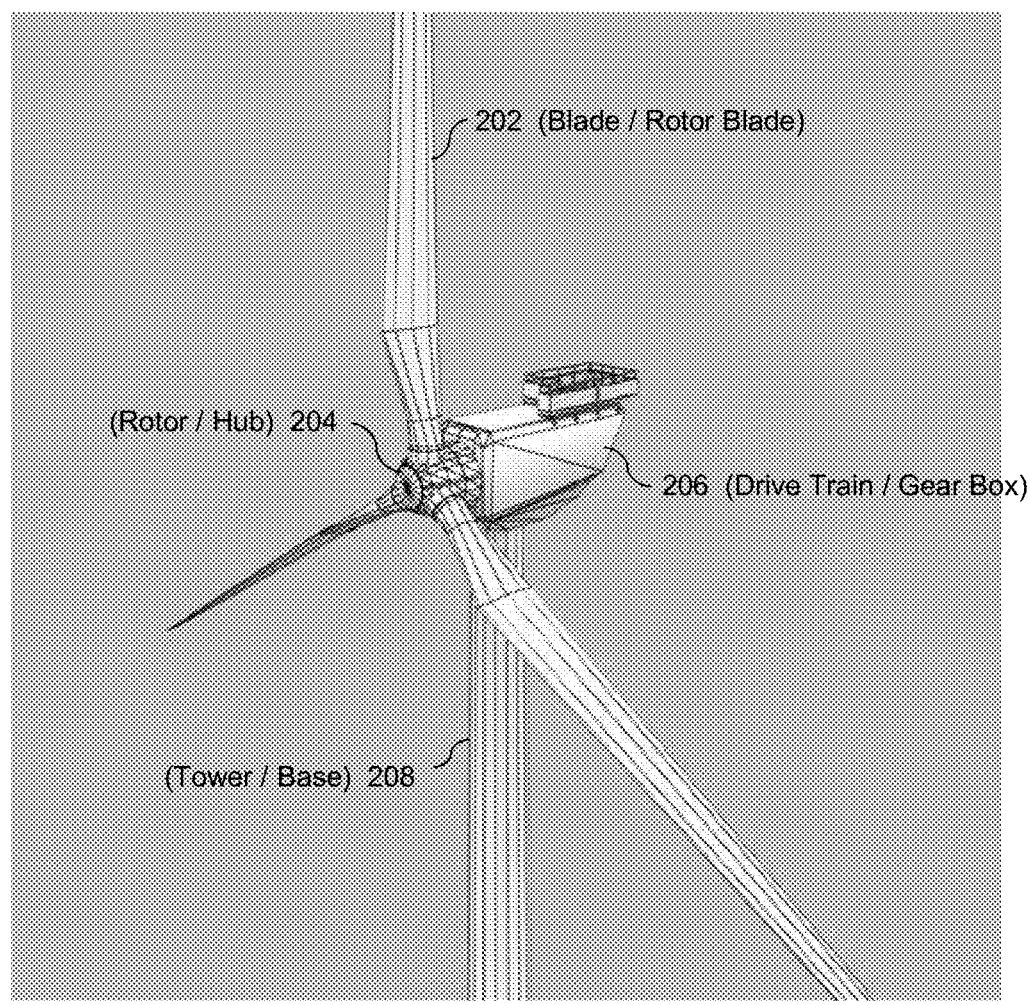
FIG. 2 is a diagram illustrating an example of tags included in a virtual model of an asset in accordance with an example embodiment.

FIG. 2 illustrates a non-limiting example of tags included in a virtual model 200 of a physical asset in accordance with an example embodiment. In this example, the virtual model 200 is a digital representation of a wind turbine. As can be seen from this simple example, major components of a wind turbine can have different naming conventions thus creating different tags when converted to the virtual model. For example, a blade 202 can also be referred to as a rotor blade. As another example, a rotor 204 can also be referred to as a hub or a motor. As yet another example, a drive train 206 can also be referred to as a gear box or a controller. As yet another example, a tower 208 can also be referred to as a base, a support, and the like. As will be appreciated, there can be many different names associated with different components (and tags representing them) for an asset. As a result, it is not possible to perform a simple keyword matching process in order to identify the same tag from different virtual assets.

Figure 3:
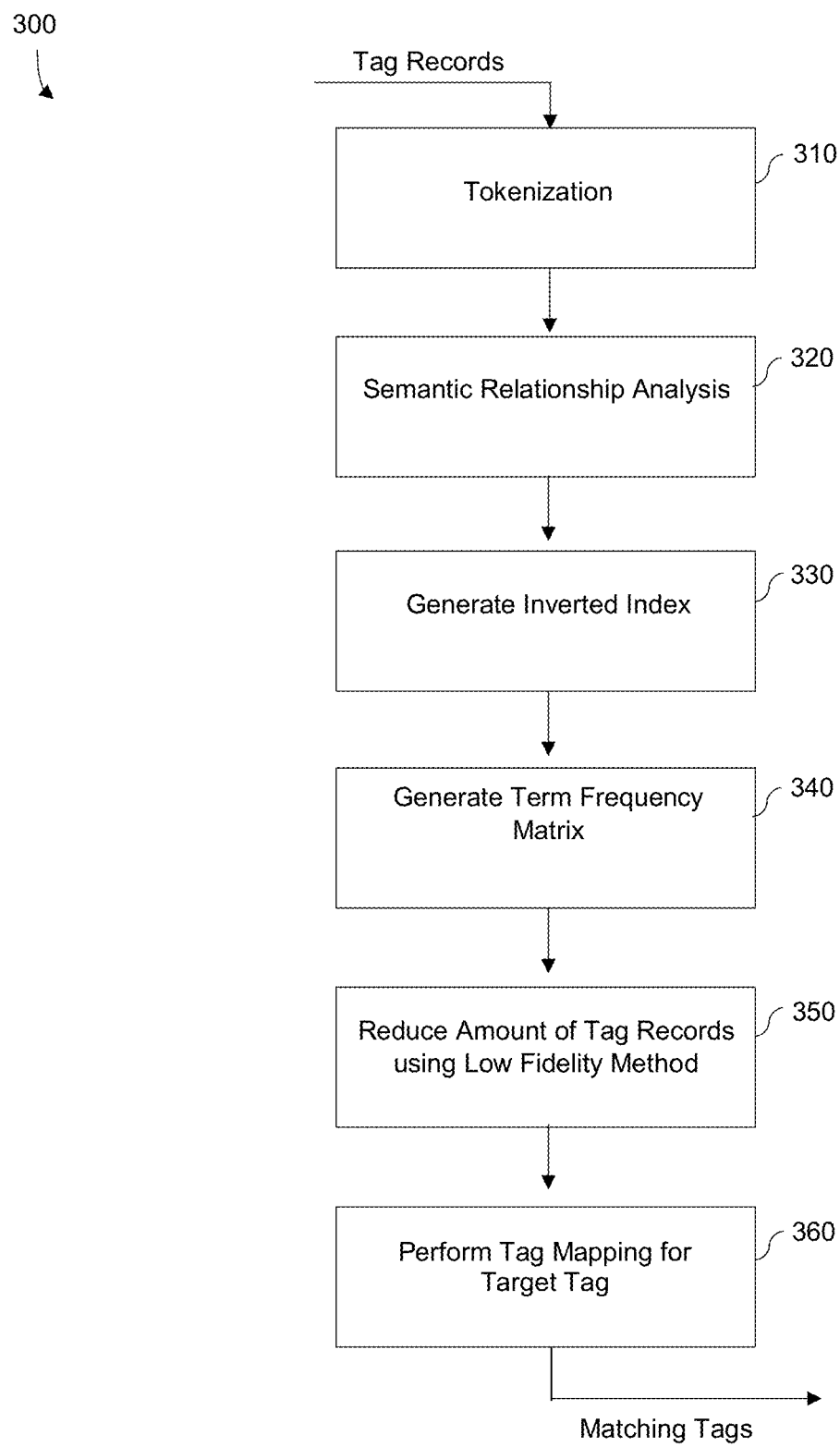
FIG. 3 is a diagram illustrating a tag mapping process in accordance with an example embodiment.

FIG. 3 illustrates a tag mapping process 300 in accordance with an example embodiment. In a typical tag mapping process, a user manually views two virtual models and identifies tags that are equivalent between the two virtual models. The example embodiments automate this process using machine learning, and provide recommendations for the customer (e.g., top 10 suggestions, etc.). Based on the feedback the models can be retrained. Known mappings can be used as training data to generate the models. Examples of natural language processing algorithms for tag mapping include N-grams, language modeling, classification, vector space model, latent semantic analysis, similarity scoring methods (e.g., Jaccard, Overlap, Jaro-Winkler, etc.), and latent Dirichlet allocation. Different algorithms can work better for different assets/data.

The tag mapping process 300 may include both customer data (e.g., a customer document) having target tags included therein, and master data (e.g., a master document) having candidate tags of other virtual models that may be mapped to a target tag included in the customer document. The tag mapping process 300 may automatically be performed for each target tag included in the customer document based on all candidate tags included the master document. As another example, a single target tag can be selected from the customer document, and a tag mapping may be performed for that single tag based on all candidate tags included in the master document. The process may use information retrieval akin to a web-based search engine. The customer data may be the equivalent of a corpus of tag data records and is the thing you want to search on, and the master data set can be broken into a series of records or queries of candidate tags. Both data sets may include table data including rows and columns. Here, each row may be a tag record corresponding to a number of tag descriptors (e.g., tag-description, tag-unit, etc.) represented by the column. The tag mapping process 300 is configured to map one row records of master data set to one or more row records of the customer data set.

Referring to FIG. 3, in 310 the process includes tokenizing the tag records included in the master and customer data. For example, each record (line) may include an ID that gets auto-generated identifying the tokenized tag record and text data from the record may be broken into tokens that represent a group of words/phrases etc. Settings can be used to customize the tokenization process. In addition to tokenization, the process may include cleaning text data by removing punctuation, digits, etc. and putting data into lowercase instead of uppercase, segmenting the data into proper terms (gasfuel="gas"+"fuel"), and the like. Each tag can also be tokenized as well (in some cases) based on user settings. During this step, business rules may be applied for search and replace. The business rules may include information provided by a user about the data (e.g., that a particular word segment means something. For example, FT10 in the customer document might correspond to a seam 10 in the master document, so a search and replace may be performed). This step improves the accuracy. The business rules can be archived in the system for later user. Some business rules may be custom and some may be standardized per domain.

In 320, semantic relations between a master data set and a customer data set can be applied, where associations between meanings of tokens between the customer and master data sets (e.g., cold and cool). Example methods may include latent Dirichlet allocation (LDA), latent semantic analysis (LSA), and the like.

In 330, an inverted index is constructed from the tokens indicating the frequency of its use within the document data, and the row record id of where the token can be found in both customer and master data sets. As further described in FIG. 6, the system utilizes a proprietary data structure, termed the data frame (also referred to herein as DataFrame) in which the analytic framework relies upon. The inverted index is an efficient term lookup tool used in standard information retrieval systems, and can be applied across multiple documents. The inverted index is stored in a data frame. Each tokenized tag record in the data frame may include, e.g., a term frequency, document frequency, and associated row metadata (i.e., tokenized term, and list of document id records of where tokenized term can be located).

In 340, a term frequency matrix is generated from the inverted index. The term frequency matrix is the numeric vector space representation of the text data. Many information retrieval algorithms work in the realm of vector spaces. By doing this, it is possible to consider these algorithms. The term frequency matrix is a matrix of data where the column labels are tokens and the row labels are document (i.e., customer, master, etc.) record ID's. The content in the matrix may be binary, raw count, or weighted count (e.g., TF-IDF) data. These first four steps 310, 320, 330, and 340 are information retrieval protocols that are implemented with the tag mapping process.

In 350, a search space reduction is performed by reducing the number of tokenized tag records in the search document (i.e., customer data set). Here, a large corpus of candidate tag records may be reduced to a smaller sub-set. For example, the process may select a target tag from the master data set and query the candidate tag records in the customer data set to identify a sub-set of candidate tags from the customer data set that are possible tag matches to the target tag from the master data set. For every query or record in the master document, a tag or set of tags that record is associated with from the customer document may be determined. For instance, a search document (i.e., customer data set) could include several hundred thousand records which are not feasible to perform a high fidelity tag mapping process. Therefore, in 350, a low-fidelity, faster, robust algorithm may be applied to the candidate tags in the customer document based on a target tag of the master to reduce the search space to a much smaller sub-set of candidate tags which are potentially a match for the target tag from the query document (i.e., master data set). Examples of the low-fidelity algorithm include the Jaccard similarity coefficient, Overlap coefficient, and the like.

In 360, a high-fidelity algorithm or algorithm ensemble may be used to rank the remaining tokenized candidate tag records. The original tokens could be gleaned from the index. While the low fidelity algorithm serves to prune the search document corpus (i.e., customer data set) to a smaller sub-set, hence consuming low computational overhead. In addition, a high fidelity algorithm (customizable) may be performed on the reduced data to rank remaining search document records. The scoring may be performed record-by-record between target tags in the reduced sub-set of customer data and candidate tags in the master data (see the example in FIG. 4).

Figure 4:
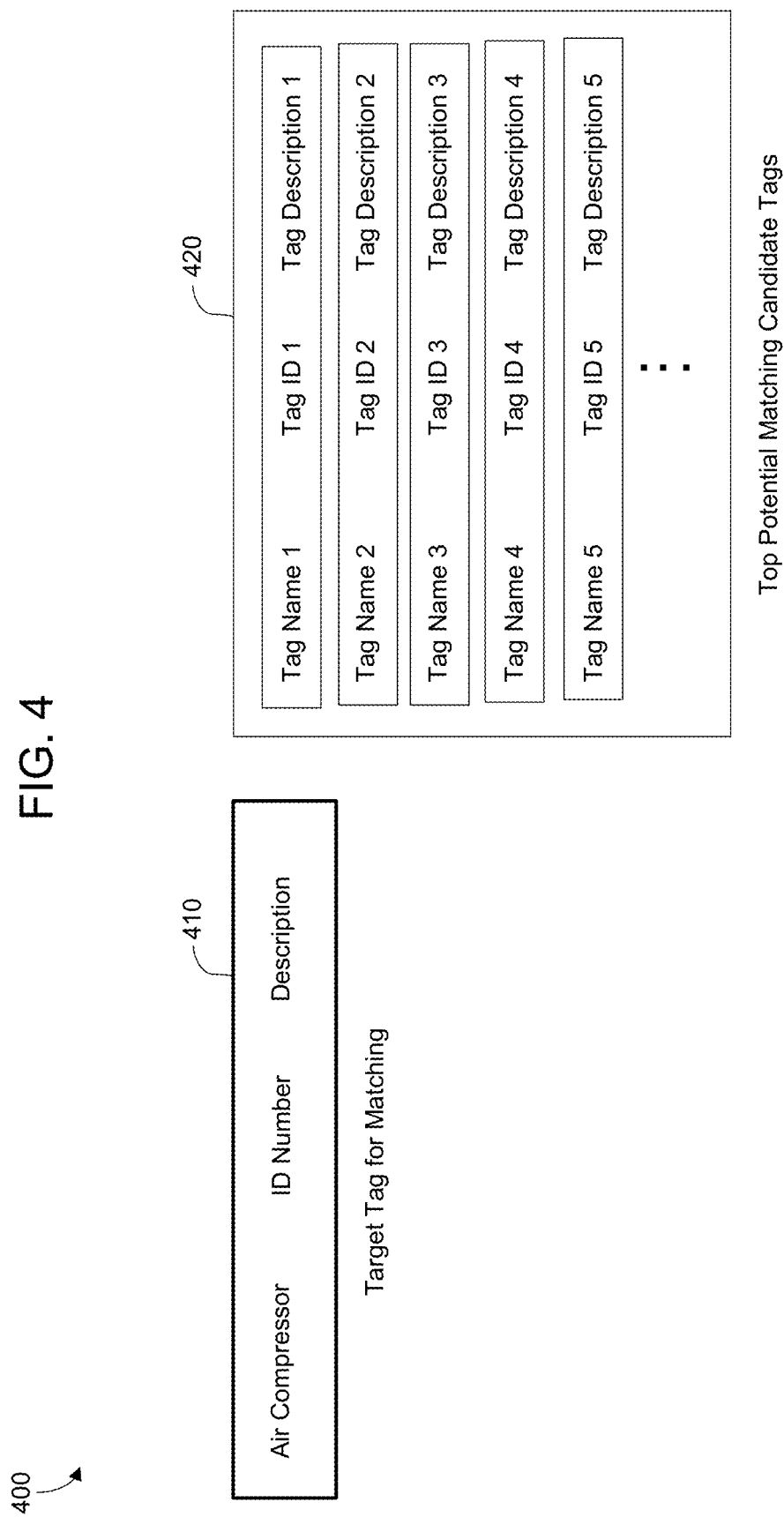
FIG. 4 is a diagram illustrating a user interface displaying a ranked output of potentially matching tags in accordance with an example embodiment.

Based on the received rankings of all remaining candidate tag records an output may be generated providing a listing of the most closely matched candidate tag records 420 with respect to a target tag record 410 via a user interface 400, as shown in FIG. 4. In this case, the user may select a candidate tag that is an exact match to the target tag based on the data provided. As a result, instead of trying to match thousands of tags, the system can provide a user with a reduced list of tags that are the best possible candidates for matching. As another example, the system can automatically determine a match without requiring a user input. The process 300 applies information retrieval techniques for the purpose of tag mapping. That is, information retrieval techniques are being integrated into a legacy tag mapping system to map together known tags. Predix is the first on the scene for large-scale IIoT. The first step for integrating analytics into old disparate legacy information management systems is tag mapping. Also, as provided below in the examples of the pluggable framework, for each step 310-360 of the tag mapping process, different algorithms and methods can be plugged-in and replaced without affecting the remaining algorithms in the process. As a result, accuracy can be improved using different algorithms and different arrangements/timings of the algorithms based on various factor such as data type, asset type, client, etc. Also, certain algorithms may perform tag mapping better for certain domains (e.g., healthcare, aviation, manufacturing, transportation, etc.)

Figure 5:
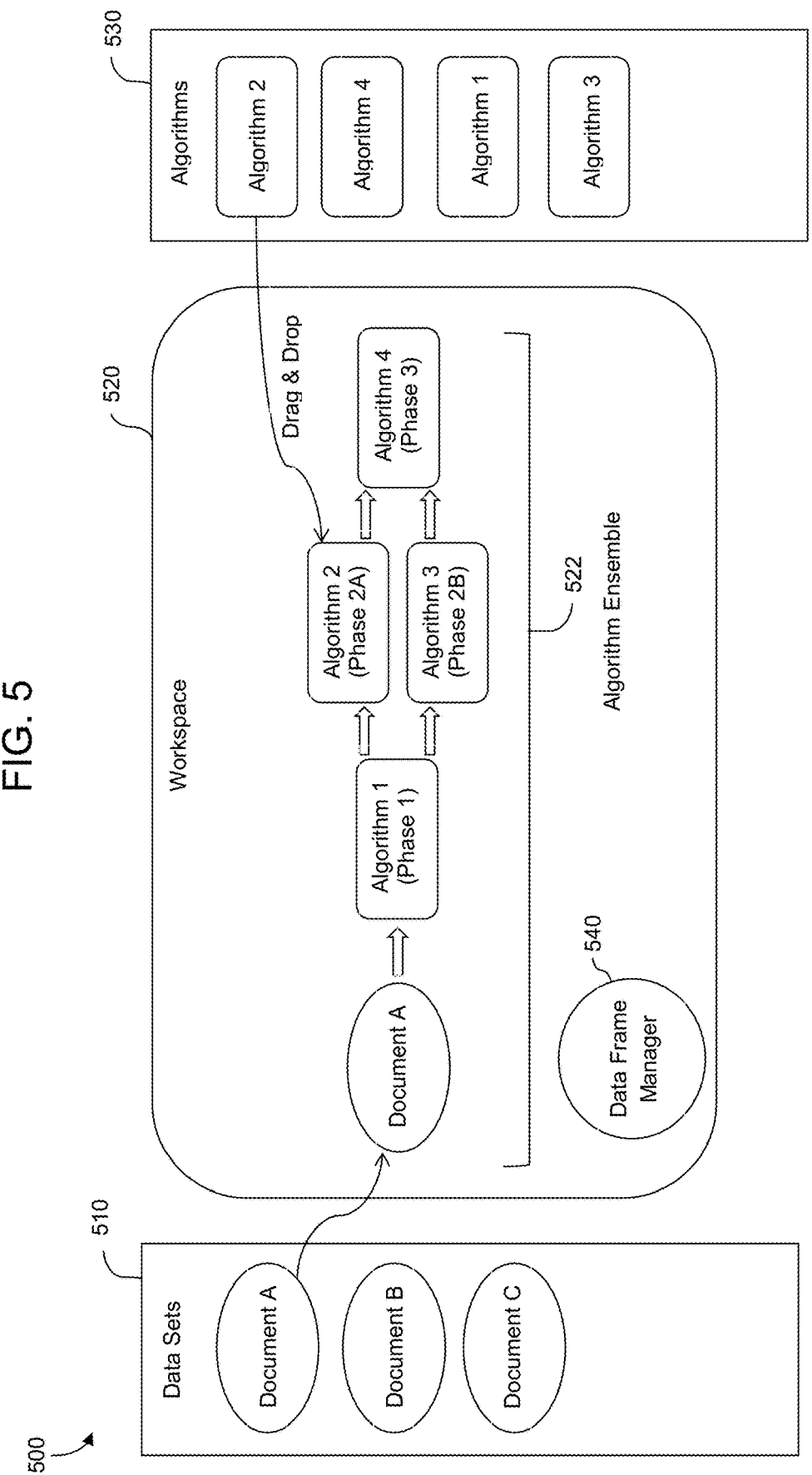
FIG. 5 is a diagram illustrating a user interface for designing an algorithm ensemble in accordance with an example embodiment.
Figure 6:
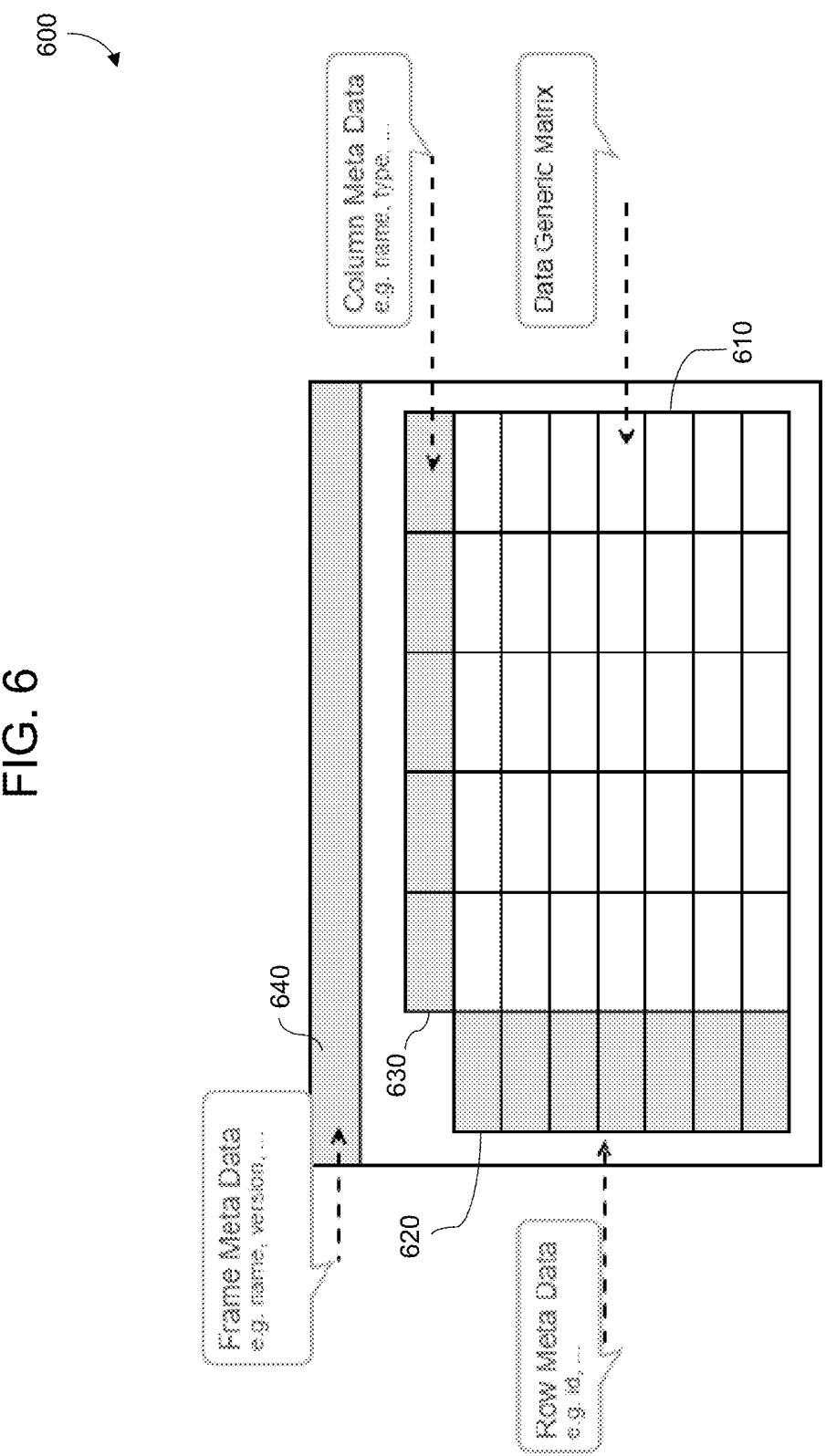
FIG. 6 is a diagram illustrating a data frame used by algorithms included in the algorithm ensemble of FIG. 5, in accordance with an example embodiment.

FIG. 5 illustrates a user interface 500 for designing an algorithm ensemble in accordance with an example embodiment, and FIG. 6 illustrates a data frame 600 that may be used by algorithms included in the algorithm ensemble of FIG. 5, in accordance with an example embodiment. Referring to FIG. 5, the user interface 500 includes a panel of data sets 510, a panel of available algorithms 530 and a workspace 520. Here, a user can build an algorithm ensemble tailored for an IoT application by dragging-and-dropping data components from panel 510 and algorithm components from panel 530 into the workspace 520. For example, if a user wishes to add a new algorithm such as algorithm 2 (Phase 2A) to algorithm ensemble 522, the user may perform a drag and drop operation and drag a graphical object representing algorithm 2 from panel 530 to workspace 520 and release the object. Furthermore, the user may also configure arrows within the workspace between data and algorithm components within the algorithm ensemble 522.

As another example, the configuration between data and algorithms may be automatically performed by a data frame manager 540.

In a traditional framework for performing data processing operations, the framework is fixed meaning that the phases/algorithms/data for performing the data processing are also fixed. Therefore, if one phase is removed, the entire data processing operation must be modified and adjusted accordingly, or it would not work. In contrast, the pluggable framework provided herein provides a set of algorithms (i.e., an algorithm ensemble) for performing a data processing operation such as tag mapping in which algorithm phases and data components can be added, removed, and replaced without affecting other algorithms and data included within the algorithm ensemble for performing the data processing operation. Here, the data processing operation may be tailored for an Internet of Things (IoT) application. One of benefits provided by the pluggable framework is the flexibility it provides to designers by allowing them to replace specific algorithms while leaving the rest of the steps in the process the same. Also, different parts/steps of the algorithm ensemble can be provided from different research groups or teams without having to coordinate data inputs and outputs. Meanwhile, in a conventional framework, the algorithms are not pluggable.

Each data component and algorithm component included in the algorithm ensemble can adhere to a common data frame protocol such as illustrated in FIG. 6. The data frame structure 600 is used as a standard data structure for all of the inputs/outputs for any algorithm that is stored in the list. Referring to FIG. 6, the data frame 600 includes a data matrix 610 that includes a table of data in rows and columns. Here, the tabular data is not limited and may include alphanumeric, float, binary, and the like. The data frame 600 also includes row metadata 620, column metadata 630, and frame metadata 640. The metadata may include additional information about the data on a row-basis, column-basis, and frame-bases. The metadata may include a version of the data, attributes, classes, types, and the like about the data.

Referring to the algorithm ensemble 522 again in FIG. 5, each input for a particular algorithm is a data frame format and each output is a data frame format. As a result, the system is assured that all algorithms can co-exist and work together by receiving predefined inputs and generating predefined outputs for one another. As long as the code within each algorithm component can handle an input/output in accordance with a common data frame, a data scientist or other developer can use any code they like (e.g., Java, R, Python) for designing the application. One of the benefits is that a data scientist can replace specific algorithms within the code with a new algorithm/code.

The algorithm ensemble 522 may include not only a chain/pipeline of algorithms, but also a data frame manager 540 which is unique to the algorithm ensemble and which manages a graph of the algorithms. The frame manager 540 may handle versioning of data frames for the algorithm ensemble 522, generate data frames from document identifiers, convert document iterators to data frames, and clean and update a data frame version graph representing the algorithm ensemble 522. In some cases, the frame manager 540 may manage an internal directed acyclic graph (DAG) also referred to as a version graph which keeps track of all different versions of data frames in a current algorithm ensemble. Each node in the graph may include a datagram object, name and version. One branch of the graph can be working at the same time as other branches of the data. Each node in the data graph can represent an algorithm or a data source or a computational function that does something with the data. For tag mapping, one node could be for master tag data, and the second node could be for customer data. A next node would perform the tokenizing and so on and so forth. Each algorithm could be replaced without touching other parts of the graphs.

Figure 7:
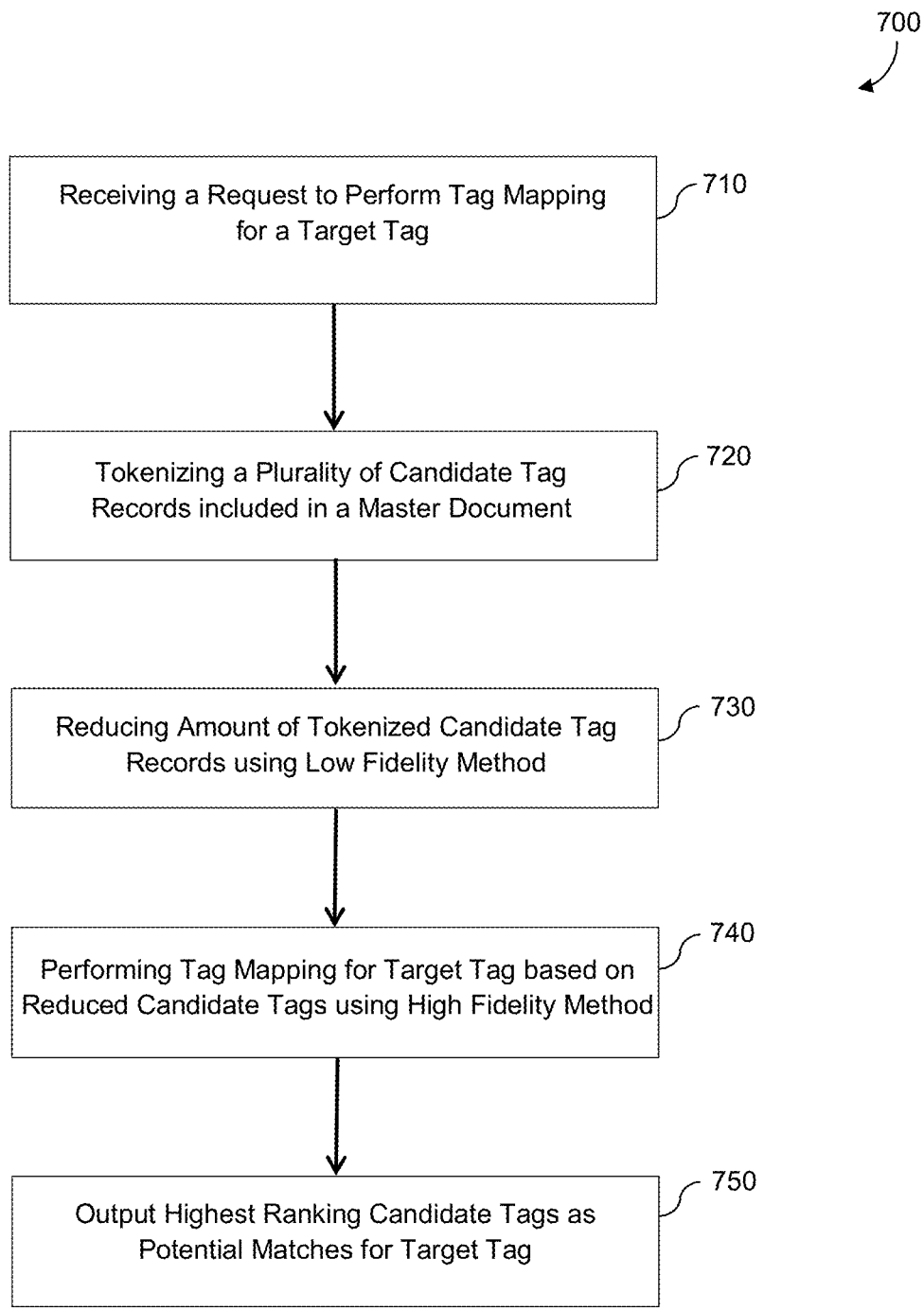
FIG. 7 is a diagram illustrating a method for tag mapping in accordance with an example embodiment.

FIG. 7 illustrates a method 700 for tag mapping in accordance with an example embodiment. For example, the method 700 may be performed by a computing device such as the cloud computing system 120 (or an application executing thereon), or another device such as a user device, a server, a combination of devices, or the like. Referring to FIG. 7, in 710 the method includes receiving a request to perform tag mapping for a target tag that identifies a target component of an asset. For example, the request may be an instruction or other command received from a processor or other component of the device. As another example, the request may be a message sent from a user device in response to a command or a button being selected. The target tag may be a component on a virtual asset. Here, the virtual asset may be a digital representation or model of a physical asset. Physical assets can include machine and equipment used in various industries such as healthcare, transportation, manufacturing, energy, and the like. Examples of assets include wind turbines, jet engines, oil platforms, gas flares, imaging systems, mining equipment, and many others.

In 720, the method includes tokenizing a plurality of tag records included in both master and customer documents where each tag record in the customer includes a candidate tag and information about the candidate tag. Here, the master and customer documents may include tabular data such as rows, columns, and the like. For example, each row may correspond to a tag and a record encompasses the tag. Each record may include an identifier of the tag (e.g., name, part number, etc.) as well as a description of the tag. The description may include textual data describing the function of the component represented by the tag. The master and customer documents may include tag record data from a plurality of different virtual assets having different naming conventions. That is, the master and customer document may include tag records having different naming conventions for a same tag. While these naming conventions may be different, the parts (i.e., tags) represented by the naming conventions may be the same. Users, applications, and the like, may benefit from analyzing a grouping of virtual assets and their components, rather than analyzing virtual assets individually. Therefore, it can be beneficial to link together virtual assets through their tags. However, conventional tag mapping requires a user to perform a manual process unless the naming of the tags is identical, which is rarely the case with different customers and uses for the virtual asset. The example embodiments overcome these obstacles by automatically mapping tags having different naming conventions through a process that incorporates information retrieval commands into a tag mapping procedure.

For example, in 730 the method includes reducing an amount of tokenized tag records in the master and customer documents based on the target tag and each tokenized tag record. For example, a low fidelity algorithm such as Jaccard indexing, Overlap scoring, and the like, which is quick and robust may be used to initially reduce the search space to a fraction of its original amount by identifying a small subset of candidate tag records that are of interest while discarding many of the candidate tag records from further consideration. The robust algorithm may perform a quick comparison based on the tokenized tag information generated in 710 and tokenized tag information of the target tag. Next, in 740, the method includes performing tag mapping with the reduced amount of tokenized tag records to identify at least one candidate tag from the reduced tokenized tag records that is a possible match to the target tag. Furthermore, in 750 the method includes outputting information concerning the identified at least one matching candidate tag for display on a display device. For example, a highest ranking amount of tags (e.g., top 3 or top 5) may be output for a user to make a positive selection for a match.

In 740, the performing of the tag mapping may include generating a ranking for each candidate tag included in the reduced amount of tokenized tag records. The ranking may be a probability that a candidate tag is a match for the target tag. The ranking may be performed on various different algorithms (or combination of algorithms) which can be adjusted by a user. Also, different algorithms may have better accuracy for different assets, customers, use cases, and the like. Here, the tag mapping may be performed based on a high-fidelity algorithm having a higher accuracy and slower processing speed than the low-fidelity algorithm which is used to perform the reduction of the search space in 730.

In some embodiments, the tokenizing in 710 may further include generating an inverted index from the tokenized tag records based on an identification of a token and a frequency of use of the token in the master document, and the reducing of the amount of tokenized tag records in 730 may be performed based on the inverted index. As another example, the tokenizing in 710 may further include generating a term frequency matrix from the inverted index where text data is converted into numeric data, and the reducing of the amount of tokenized tag records in 730 may be performed based on the term frequency matrix. In some embodiments, the reducing of the amount of tokenized tag records in 730 may further be performed based on semantic relationships between words included in the tokenized tag records.

Figure 8:
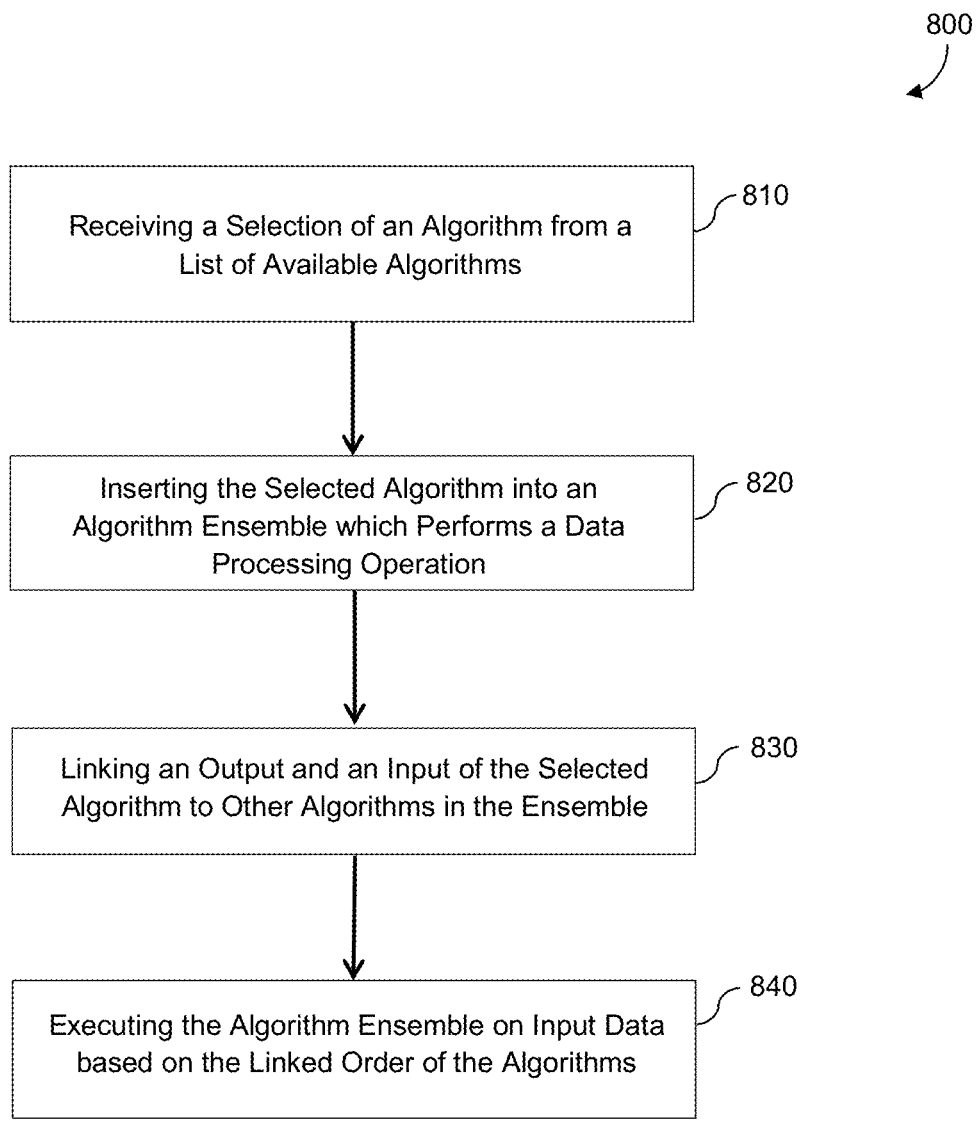
FIG. 8 is a diagram illustrating a method for building an algorithm ensemble in accordance with an example embodiment.

FIG. 8 illustrates a method 800 for building an algorithm ensemble in accordance with an example embodiment. The method 800 may be performed by a computing device such as the cloud computing system 120 (or an application executing thereon), or another device such as a user device, a server, a combination of devices, or the like. Referring to FIG. 8, in 810 the method includes receiving a selection of an algorithm from among a plurality of available algorithms. For example, the selection may be performed by a user performing a drag-and-drop operation by selecting an algorithm from among a plurality of available algorithms included in a panel of a user interface. The selected algorithm may be one phase of a multi-phase data processing operation such as tag mapping, or other data processing operations such as information retrieval, and the like. The drag-and-drop operation may be performed by a user moving a cursor around the user interface. For example, the user may select an identifier of the algorithm from a panel of the user interface, drag the identifier across the screen and drop the identifier into a workspace thereof.

In 820, the method includes inserting the selected algorithm into an algorithm ensemble including a grouping of algorithms which combine to perform a data processing operation, and in 830, linking an input of the selected algorithm to an output of a first algorithm and linking an output of the selected algorithm to an input of a second algorithm, from among the algorithms included in the algorithm ensemble. Each algorithm included in the algorithm ensemble may include executable code that is configured to receive input data having a common data frame structure and to transmit output data having the common data frame structure. For example, the common data frame structure may include the structure show in FIG. 6, or another type of data frame, and include a data matrix including rows and columns of data, and metadata associated with the data.

In 840, the method includes executing the algorithm ensemble on input data in an order defined by the linking to generate a processing result of the input data. For example, the executing of the algorithm ensemble may be performed by a frame manager that is unique to the respective algorithm ensemble, and the frame manager may be configured to manage data as it moves between the algorithms included in the algorithm ensemble. As one non-limiting example, the executed algorithm ensemble may perform a tag mapping data processing operation, and each algorithm in the algorithm ensemble may be associated with at least one phase from among a plurality of phases included in the tag mapping data processing operation. One of the benefits of the method of FIG. 8 is that a customer can replace one or more algorithms while leaving the remaining algorithms/data of the process the same. This provides the customer a lot of flexibility. Also, different parts/steps of the algorithm may be provided from different research groups as long as they adhere to a predefined data format thus enabling each group or designer to use a programming language they are most comfortable with or that best suits the task at hand. In contrast, in a conventional framework, the algorithms are not pluggable, rendering the application of different algorithm ensembles coded in different languages to various problems particularly cumbersome. Moreover, the pluggable framework provided herein permits the efficient optimization of which components within an algorithm ensemble should be applied to various problems by permitting a mechanism to seamlessly switch between different component algorithms.

Although not shown in the method of FIG. 8, in some embodiments the method may further include removing an algorithm from the algorithm ensemble and replacing the removed algorithm with another algorithm from among the available algorithms, based on a second selection. Here, the removed algorithm and the replacement algorithm may be designed using different programming languages. For example, the initial algorithm may be programmed using Java while the replacement algorithm may be programmed using R or Python. Each algorithm may further include a filter capable of modifying input data and/or output data. Also, the replacing of the removed algorithm with the replacement algorithm does not affect a functioning of any other algorithm included in the algorithm ensemble.

Figure 9:
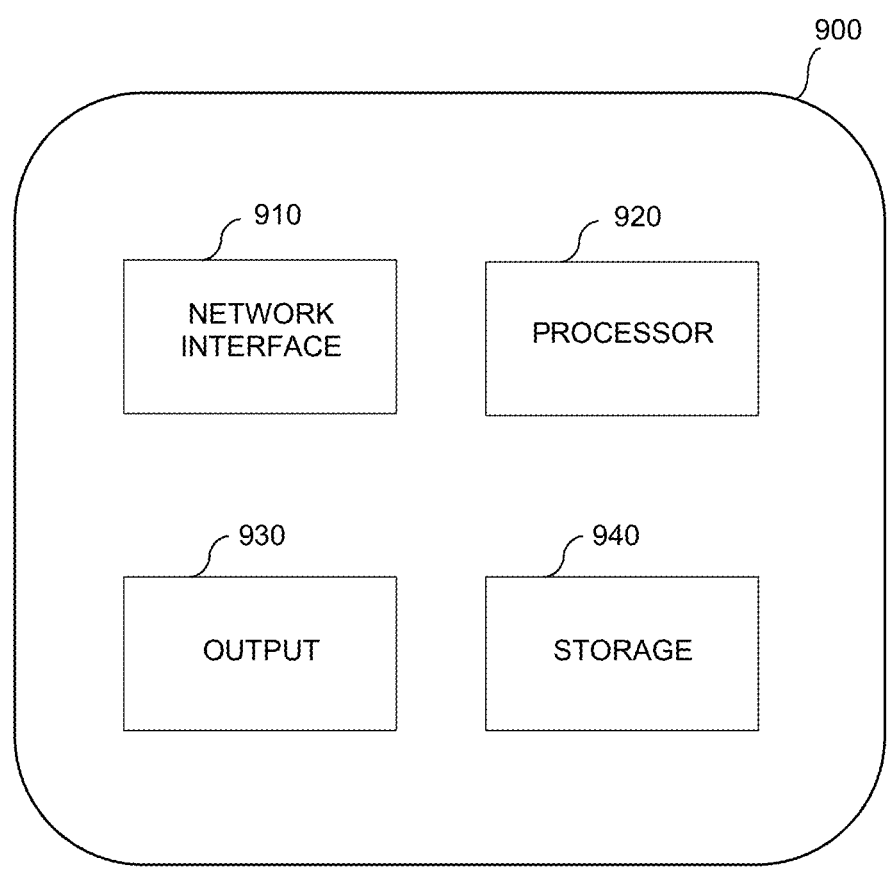
FIG. 9 is a diagram illustrating an example of a computing device in accordance with example embodiments.

FIG. 9 illustrates a computing system 900 in accordance with example embodiments. For example, the computing system 900 may be implemented within a cloud computing environment, a server, a user device, and the like. Referring to FIG. 9, the computing system 900 includes a network interface 910, a processor 920, an output 930, and a storage device 940. Although not shown in FIG. 9, the computing system 900 may include other components such as a display, an input unit, a receiver/transmitter, and the like. The network interface 910 may transmit and receive data over a network such as the Internet, a private network, a public network, and the like. The network interface 910 may be a wireless interface, a wired interface, or a combination thereof. The processor 920 may include one or more processing devices each including one or more processing cores. In some examples, the processor 920 is a multicore processor or a plurality of multicore processors. Also, the processor 920 may be fixed or it may be reconfigurable. The output 930 may output data to an embedded display of the computing system 900, an externally connected display, a cloud, another device, and the like. The storage device 940 is not limited to any particular storage device and may include any known memory device such as RAM, ROM, hard disk, and the like.

According to various embodiments, the network interface 910 may receive a request to perform tag mapping for a target tag that identifies a target component of an asset. For example, the target tag may identify or otherwise represent a part or component of a virtual asset. Here, the virtual asset may be a digital twin of a physical asset such as a turbine, locomotive engine, X-ray machine, mining equipment, or the like. The processor 920 may perform an information retrieval process on a database of tag data and tokenize a plurality of tag records included in a master document where each tag record includes a candidate tag and information about the candidate tag. Furthermore, the processor 920 may reduce an amount of tokenized tag records in the master document based on the target tag and each tokenized tag record. Further, the processor 920 may perform tag mapping with the reduced amount of tokenized tag records to identify at least one candidate tag from the reduced amount of tokenized tag records that is a possible match to the target tag. The output 930 may output information concerning the identified at least one matching candidate tag for display on a display device. For example, the output 930 may output a list of the most closely matched candidate tags (e.g., top 10) with respect to the target tag and enable a user to select one or more of the candidate tags as a match.

For example, the target tag and one or more candidate tags included in the he master document may include tag records having different naming conventions for a same tag. In this case, even though a tag on a first virtual asset corresponds to a tag on a second virtual asset, the two tags may have different naming conventions and thus not be able to be matched by name alone. The processor 920 may perform a tag mapping process to automate such a match based on various algorithm ensembles. In some embodiments, the processor 920 may further generate an inverted index from the tokenized tag records based on an identification of a token and a frequency of use of the token in the master document, and reduce the amount of tokenized tag records based on the inverted index. In other embodiments, the processor 920 may generate a term frequency matrix from the inverted index where text data is converted into numeric data, and reduce the amount of tokenized tag records based on the term frequency matrix. In some embodiments, the processor 920 may reduce the amount of tokenized tag records based on semantic relationships between words included in the tokenized tag records.

The processor 920 may perform a tag mapping process for one target tag in comparison to a plurality of candidate tags. As another example, the processor 920 may perform a tag mapping process for a plurality of target tags based on a plurality of candidate tags. In this later example, the processor 920 may receive a first document (e.g., target document) including a plurality of target tag records and a second document (e.g., master document) including a plurality of candidate tags. Here, the processor 920 may tokenize tag records in both the target document and the master document, perform information retrieval steps on both the tokenized target tag records and the tokenized candidate tag records, and perform a tag mapping process for each tokenized target tag among the plurality of tokenized target tag records based on the plurality of tokenized candidate tag records.

As another example, the computing system 900 may be associated with a pluggable framework. Here, the storage 940 may store instructions for the pluggable framework and the processor 920 may execute the instructions to generate the pluggable framework. For example, the processor 920 may receive a selection of an algorithm from among a plurality of available algorithms, and insert the selected algorithm into an algorithm ensemble including a grouping of algorithms which combine to perform a data processing operation. For example, the inserting may include linking an input of the selected algorithm to an output of a first algorithm and linking an output of the selected algorithm to an input of a second algorithm, from among the algorithms included in the algorithm ensemble. Also, the processor 920 may execute the algorithm ensemble on input data in an order defined by the linking to generate a processing result of the input data.

In some embodiments, the plurality of available algorithms may be displayed on a display by the processor 920. For example, the processor 920 may control the output 930 to output a user interface, and receive the selection of the algorithm by detecting, by the processor 920, a drag-and-drop operation via the user interface in which an identifier of the algorithm is selected and dropped into a workspace of the user interface. Here, each algorithm included in the algorithm ensemble may include executable code that is configured to receive input data having a common data frame structure and to transmit output data having the common data frame structure.

In some embodiments, the processor 920 may remove an algorithm from the algorithm ensemble and replace the removed algorithm with another algorithm from among the available algorithms, based on a second selection. Here, the removed algorithm and the replacement algorithm may be designed using different programming languages (e.g., Java, Python, R, etc.). According to various embodiments, the replacing of the removed algorithm with the replacement algorithm does not affect a functioning of any other algorithm included in the algorithm ensemble. In some embodiments, the algorithm ensemble executed by the processor 920 may perform a tag mapping data processing operation, and each algorithm in the algorithm ensemble may be at least one phase from among a plurality of phases included in the tag mapping data processing operation.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a processor configured to
   tokenize a plurality of candidate tag records;
   reduce the tokenized tag records in the candidate data set based on a target tag and the plurality of tokenized candidate tag records; and
   execute a machine learning algorithm which performs automated tag mapping with the reduced tokenized tag records to identify at least one candidate tag that is a match to the target tag.

2. The computing system of claim 1, wherein each candidate tag record comprises a descriptive identifier of an industrial asset or a part of the industrial asset.

3. The computing system of claim 1, wherein the processor is configured to break-up a descriptive identifier within a candidate data tag record into a group of tokens.

4. The computing system of claim 1, wherein the processor is configured to remove one or more of punctuation and digits from a descriptive identifier within a candidate data tag record.

5. The computing system of claim 1, wherein the processor is configured to generate a unique identifier for a tokenized candidate tag record, and store the unique identifier within the tokenized candidate tag record.

6. The computing system of claim 1, wherein the processor is configured to reduce a number of the tokenized tag records based on semantic relationships between descriptive identifiers of industrial assets included in the tokenized tag records.

7. The computing system of claim 1, wherein the processor is configured to execute a first machine learning algorithm on tokenized descriptive identifiers within the candidate tag records to reduce the plurality of tokenized tag records to a subset of tokenized candidate tag records.

8. The computing system of claim 7, wherein the processor is further configured to execute a second machine learning algorithm on the tokenized descriptive identifiers within the subset of tokenized tag records to reduce the subset of tokenized tag records to a predetermined number of best matching tag records.

9. A method comprising:
- tokenizing, via a processing device, a plurality of candidate tag records;
- reducing, via the processing device, the tokenized tag records in the candidate data set based on a target tag and the plurality of tokenized candidate tag records; and
- executing a machine learning algorithm, via the processing device, which performs automated tag mapping with the reduced tokenized tag records to identify at least one candidate tag that is a match to the target tag.

10. The method of claim 9, wherein each candidate tag record comprises a descriptive identifier of an industrial asset or a part of the industrial asset.

11. The method of claim 9, wherein the tokenizing comprises breaking-up a descriptive identifier within a candidate data tag record into a group of tokens.

12. The method of claim 9, wherein the tokenizing comprises removing one or more of punctuation and digits from a descriptive identifier within a candidate data tag record.

13. The method of claim 9, wherein the tokenizing comprises generating a unique identifier for a tokenized candidate tag record, and storing the unique identifier within the tokenized candidate tag record.

14. The method of claim 9, wherein the reducing comprises reducing a number of tokenized tag records based on semantic relationships between descriptive identifiers of industrial assets included in the tokenized tag records.

15. The method of claim 9, wherein the reducing comprises executing a first machine learning algorithm on tokenized descriptive identifiers within the candidate tag records to reduce the plurality of tokenized tag records to a subset of tokenized candidate tag records.

16. The method of claim 15, wherein the reducing further comprises executing a second machine learning algorithm on the tokenized descriptive identifiers within the subset of tokenized tag records to reduce the subset of tokenized tag records to a predetermined number of best matching tag records.

17. A non-transitory computer-readable storage medium comprising instructions which when executed by a processor cause a computer to perform a method comprising:
- tokenizing, via a processing device, a plurality of candidate tag records;
- reducing, via the processing device, the tokenized tag records in the candidate data set based on a target tag and the plurality of tokenized candidate tag records; and
- executing a machine learning algorithm, via the processing device, which performs automated tag mapping with the reduced tokenized tag records to identify at least one candidate tag that is a match to the target tag.

18. The non-transitory computer-readable storage medium of claim 17, wherein each candidate tag record comprises a descriptive identifier of an industrial asset or a part of the industrial asset.

19. The non-transitory computer-readable storage medium of claim 17, wherein the tokenizing comprises breaking-up a descriptive identifier within a candidate data tag record into a group of tokens.

20. The non-transitory computer-readable storage medium of claim 17, wherein the tokenizing comprises removing one or more of punctuation and digits from a descriptive identifier within a candidate data tag record.

* * * * *